Aug. 20, 1940.   F. C. CAVE   2,211,879
AUTOMOBILE LOG
Filed March 13, 1939   2 Sheets-Sheet 1
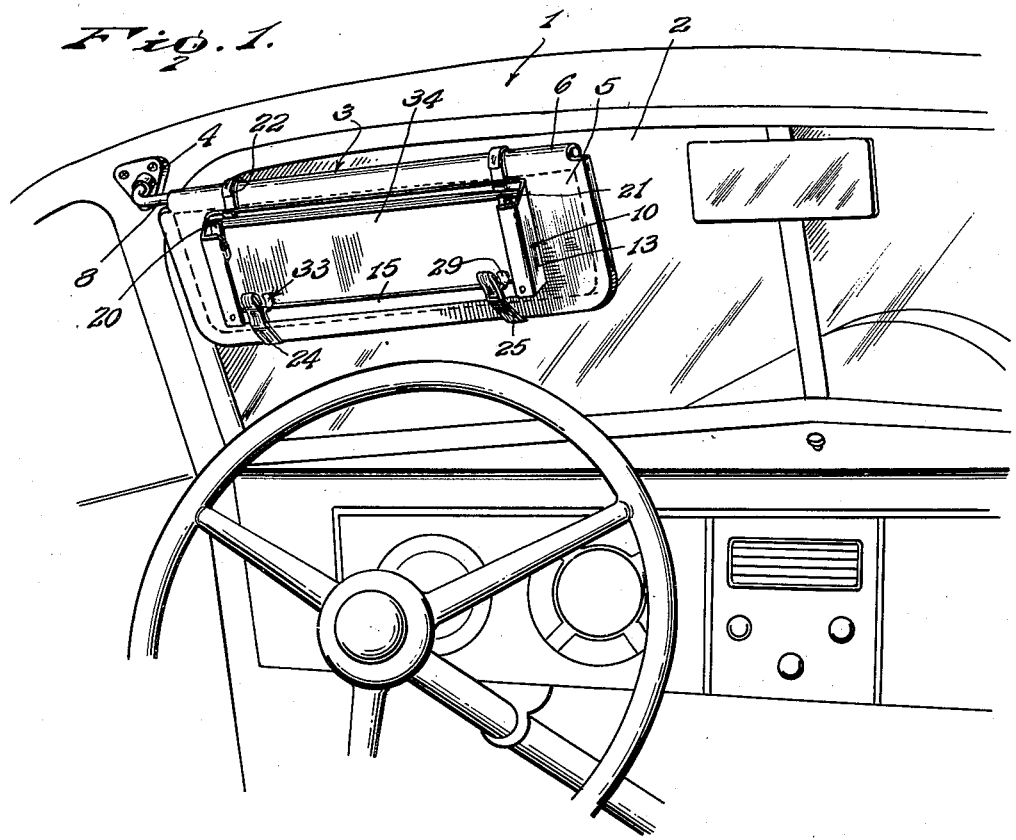
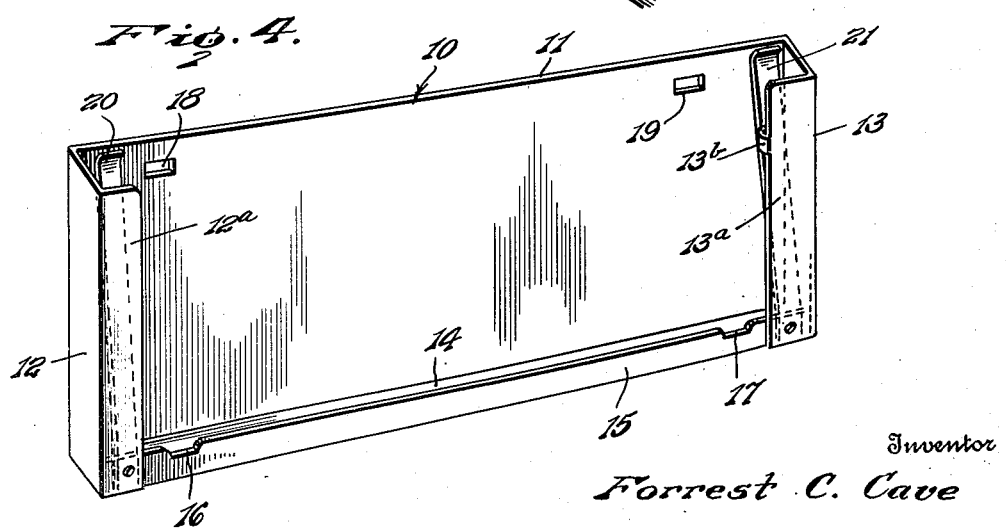
Inventor
Forrest C. Cave
By Lacey & Lacey,
Attorneys Aug. 20, 1940.   F. C. CAVE   2,211,879
AUTOMOBILE LOG
Filed March 13, 1939   2 Sheets-Sheet 2
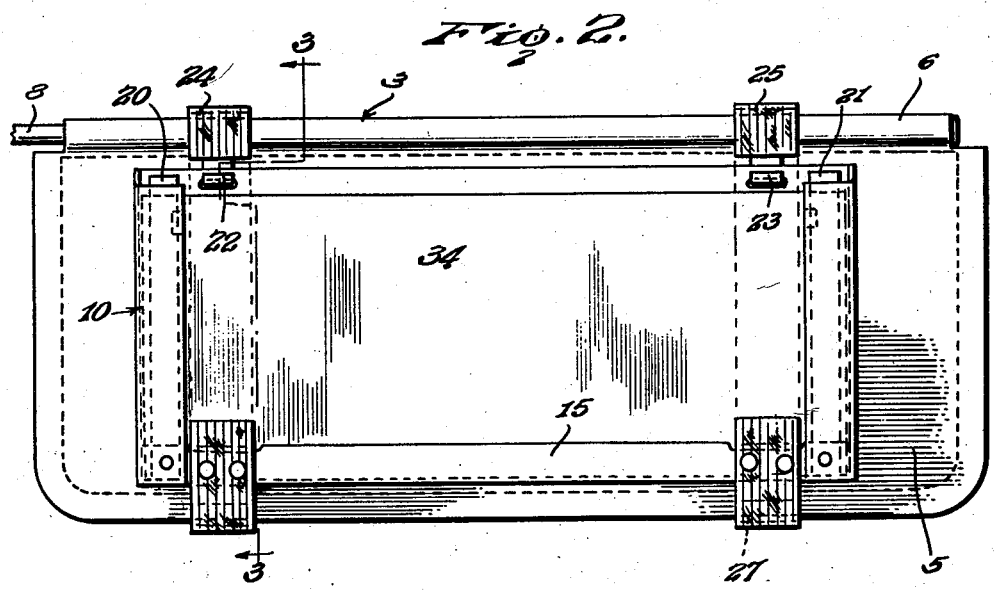
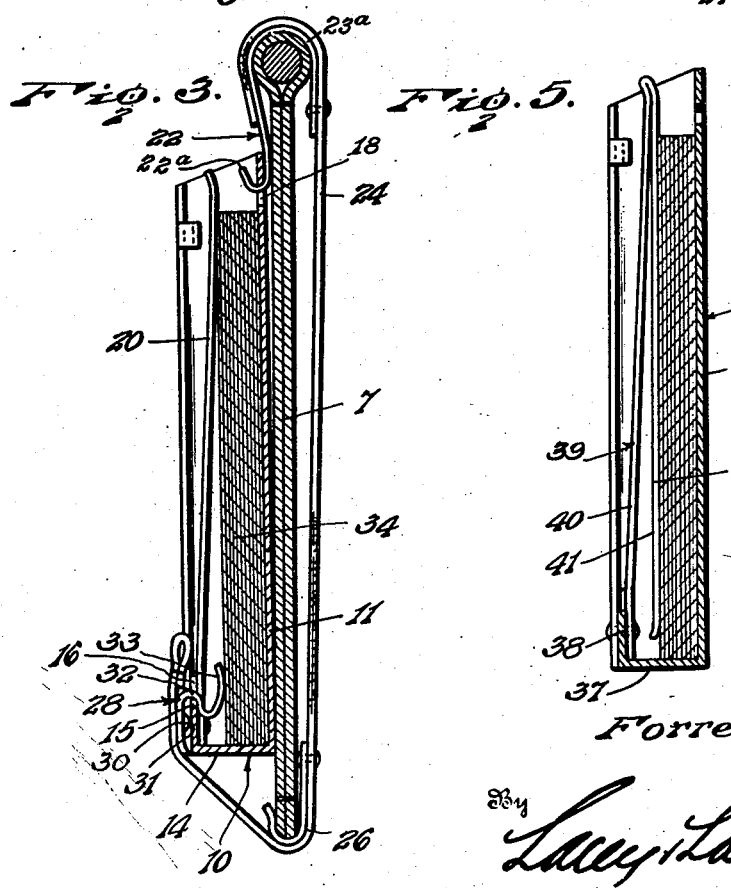
Inventor
Forrest C. Cave.
By Lacey & Lacey, Attorneys Patented Aug. 20, 1940

2,211,879

UNITED STATES PATENT OFFICE 2,211,879

AUTOMOBILE LOG

Forrest C. Cave, Salina, Kans.

Application March 13, 1939, Serial No. 261,685

4 Claims. (Cl. 281—44)

This invention relates to an improved automobile log.

One object of the invention is to provide an automobile log which will be mounted on the sun visor of an automobile for convenient use, and which will employ a writing surface for a business man or vacationist to record his thoughts on paper so that he may have them at hand when needed.

A further object of the invention is to provide a device of this character which may be readily attached or detached from the sun visor.

A still further object of the invention is to provide an automobile log wherein means are employed for effectively retaining the paper in position for convenient use, said means, however, permitting ready removal of the paper as desired.

As a still further object, the invention seeks to provide an automobile log which may be manufactured cheaply, to retail at an attractive figure, and which will be highly efficient in use.

Other and incidental objects of the invention will become apparent as the description proceeds.

My improved automobile log is illustrated in the accompanying drawings, wherein:

Figure 1 is a perspective view showing my improved automobile log in operative position on a sun visor, Figure 2 is a front elevation of the device as it would appear installed, Figure 3 is a vertical sectional view of the device, installed, on the line 3—3 of Figure 2 looking in the direction indicated by the arrows, Figure 4 is a perspective view of the frame or container employed, and Figure 5 is a vertical sectional view showing a slightly modified form of paper retaining spring.

Referring now more particularly to the drawings wherein, as will be seen, similar numerals of reference are used to designate similar parts throughout the various views, the numeral 1 indicates, in general, the driving compartment of a motor vehicle. At 2 is shown the wind shield and at 3 is shown the sun visor which is mounted in a bracket 4 disposed above and to the left of the wind shield. Although the sun visor disclosed is of convenient construction, it is deemed advisable to point out certain of the parts thereof. The sun visor includes a body 5 which is formed with a loop 6 at one end and plies of material 7. The loop 6 is swingingly mounted on a mounting rod 8 which extends through the loop throughout its length. It will be seen that the sun visor may be swung to inoperative position lying parallel to the ceiling of the vehicle or in operative position disposed substantially parallel to the wind shield.

My improved automobile log includes a container or frame which is shown in perspective in Figure 4. The container is shown generally at 10 and includes a back wall 11 and end flanges 12 and 13 which are formed with laterally and inwardly extending overhanging flanges 12a and 13a. Each of the flanges 12a and 13a is formed, at its inner edge, with a lug which is bent to form a latch 13b. The container 10 is closed at its bottom by a bottom wall 14 and includes a front flange 15 formed with notches 16 and 17 near its opposite corresponding end. The back wall 11 is formed near its upper edge and near its opposite corresponding end with openings 18 and 19. Mounted in the container 10 and having their lower corresponding ends riveted or otherwise suitably secured to the opposite end of the front flange 15 between said flange and said overhanging flanges 12a and 13a are leaf springs 20 and 21, the purpose of which will be set forth in more detail hereinafter.

In order to mount the automobile log in position on the sun visor, I provide a pair of upper hooks 22 and 23 which are each provided with bills 22a engageable, respectively, through the openings 18 and 19 in the back wall of the container 11. The upper hooks 22 and 23 are also each provided with a hook portion 23a which engages over the loop 6. These hooks are connected by means of elastic straps 24 and 25, respectively, to lower hooks 26 and 27, said lower hooks engaging over the lower end portion of the body of the sun visor at its opposite ends. The straps 24 and 25 are extended forwardly and upwardly and have secured to their free end portions clamping hooks which are shown generally at 28 and 29. The hooks 28 and 29 are identical in formation so that a description of one will suffice for both. The hook 28, for example, includes a flat portion 30 which is riveted at 31 to the strap 24. Said hook 28 also includes a bowed portion 32 which is engageable over the front flange 15 within the notch 16 thereof. The lower portion 32 is bent upon itself and extended to define a spring portion 33 which will be engageable with sheets of paper or cards, shown at 34, which are carried in the container. By referring to Figure 1 of the drawings, it may be seen that the opposite end portions of the sheets of paper or cards 34 are held in place by means of the springs 20 and 21, said springs engaging the upper portions of the foremost of said cards at its opposite corresponding end for retaining said cards in place, the lower end of the card being held in place by the spring portion 33.

It is believed that the operation of my improved automobile log will be obvious from the foregoing description. However, it is thought that a short discussion of the operation will not be out of place. As will be understood from a reading of the foregoing description, the installation of the automobile log on the sun visor is quite simple. To install, it is only necessary to engage the hooks 22 and 23 in the openings 18 and 19, the bowed portion of said hooks being engaged over the loop 6 of the body of the sun visor. The straps 24, which are of elastic material, are easily stretched for engaging the hooks 26 and 27 over the lower end portion of the body of the sun visor. It will now be seen that the sun visor is anchored to the body at its upper end. The straps 24 and 25 are stretched forwardly and upwardly for engaging the bowed portions 32 of the hooks 28 and 29 in the notches 16 and 17 of the flange 15. Due to the elastic nature of the straps 24 and 25, the lower end portion of the container will be urged toward the lower end portion of the sun visor body. Also, the hooks 28 and 29 will be urged away from the hooks 22 and 23 by the elastic straps 24 and 25 so that the hooks will always be retained in place in their respective openings.

To remove the device from the sun visor, it is only necessary to disengage the hooks 28 and 29 from the flange 15, when the hooks 26 and 27 may also be disengaged and the straps freed from the sun visor body. In case of necessity, the entire automobile log may be slipped bodily along the sun visor and freed at the ends thereof. It should be borne in mind, however, that the elastic straps 24 and 25 will exert sufficient tension to retain the sun visor in proper operative position.

It is desired particularly to call attention to the fact that it is not necessary to remove the entire device from the sun visor except when transferring it from one vehicle to another. In other words, it is only necessary to disengage the hooks 28 and 29 from the front flange 15, when the entire container may be removed, it being understood that the hooks 22 and 23 are disengaged from the openings 18 and 19. The container, with cards therein, may be moved about as desired.

For the purpose of removing or installing the sheets of paper 34, it is only necessary to lift the springs 20 and 21 for relieving the tension thereof on the ends of the paper. The springs 20 and 21 may be engaged behind the latches 13ᵇ and retained therebehind until the desired amount of paper is in place. The sheets may then be slipped upwardly or on the back wall 11 against which they lie.

Reference is now had to Figure 5 of the drawings, wherein the container is shown at 35. The container includes a rear wall 36, a bottom wall 37 and a front flange 38. To the opposite end of the corresponding edge of the front flange 38 are secured springs 39 which include outer leaves 40 and inner leaves 41. The outer leaves 40 have their lower corresponding ends riveted or otherwise suitably secured to the opposite corresponding ends of the front flange 38. As will be seen, the inner leaves 41 are formed by bending the outer leaves 40 upon themselves and springing the end portions away from the said outer leaves. The inner leaf 41 will lie against the sheets of paper 42 and will retain said sheets in place effectively. Attention is called to the fact that the inner leaves 41 extend throughout substantially the entire length of the side margins of the sheets 42 so that danger of displacement of said sheets will be avoided.

Aside from the construction of the springs 39, the construction and operation of the modified form of the invention is identical with that of the preferred form.

It is believed that further description of my invention is unnecessary.

Having thus described the invention, what is claimed as new is:

1. In a device of the class described, in combination with a sun visor having a loop, a container having a back wall provided with an opening, said container having a front flange formed with a notch, a hook having a bill engageable through the opening and a hook portion engageable over the loop of the sun visor, a hook engageable over the lower end portion of the sun visor, a hook engageable within the notch in the front flange, and a resilient strap connecting all of the hooks to each other and extending about and between the upper and lower edges of the sun visor and forwardly thereof, said resilient strap and hooks securing the container to the sun visor, the lower end portion of said resilient strap being shiftable for detaching the last mentioned hook from the notch in the front flange of the container so that said container may be removed from the sun visor.

2. In an automobile log, a container, and means for detachably securing the container to a sun visor, said means including a hook engageable over the upper edge of the sun visor, said hook having a portion detachably connected with the container, a second hook engageable about the lower edge of the sun visor, a hook engageable with the lower edge of the container, and a resilient strap connecting all of said hooks, the lower end of said strap being shiftable for freeing the last mentioned hook from the container whereby the container may be freed from the sun visor without disengaging the remaining hooks and strap from said sun visor.

3. In an automobile log, a container having a back wall, a bottom wall and a front flange, and a leaf spring carried in the container and secured to the front flange, said spring having an end portion engageable with the margins of sheets of paper within the container for preventing accidental displacement of said sheets, said front flange having a latch engageable with the free end of the spring for holding said spring in arrested position during removal from or insertion of sheets of paper into the container.

4. In an automobile log, a container having a back wall provided with an opening, end flanges and a front flange, a hook having a bill engageable through the opening and having a hook portion engageable about the loop of a sun visor, hooks engageable over the lower end portion of the sun visor, clamping hooks engageable over the front flange of the container, said front hooks including bowed portions bent and extended to provide spring portions engageable with sheets of paper in the container whereby said sheets will be held in place, resilient straps connecting the first-mentioned hook to the second-mentioned hooks and detachably securing the container to the sun visor, and leaf springs carried by the container and engageable with the paper therein for retaining said paper in place within the container.

FORREST C. CAVE.